March 10, 1959     F. DOSTAL     2,877,365

ELECTROMAGNETIC TORSIONAL TUNING FORK

Filed May 25, 1956

INVENTOR
F. DOSTAL
BY
ATTORNEY

March 10, 1959 F. DOSTAL 2,877,365
ELECTROMAGNETIC TORSIONAL TUNING FORK
Filed May 25, 1956 2 Sheets-Sheet 2

INVENTOR
F. DOSTAL
BY

ATTORNEY

United States Patent Office 2,877,365
Patented Mar. 10, 1959

2,877,365

ELECTROMAGNETIC TORSIONAL TUNING FORK

Frank Dostal, Great Neck, N. Y., assignor to American Time Products, Inc., New York, N. Y., a corporation of Delaware Application May 25, 1956, Serial No. 587,368

10 Claims. (Cl. 310—25)

The instant invention relates to oscillators or more particularly to electrically driven tuning forks.

An object of the instant invention is to provide an electrically driven tuning fork oscillator which is not subject to error, irrespective of its attitude or any accelerating force to which it may be subjected.

Still another object is to provide a tuning fork of such configuration and mode of vibration that it is readily capable of maintaining its frequency invariable, even though it may be in accelerated motion as a unit in varying directions, on incorporation as the constant frequency source in modern weapon systems for example, by virtue of its construction and mode of operation per se.

Still another object is to provide an electromechanical oscillator which is always of its constant rated frequency, and in which the vibratory motion of its elements is mutually balanced so that there is no transmission of vibration to its support.

Prior art tuning forks are subject to errors due to attitude and acceleration because gravity and acceleration add to, or subtract from, the restoring force normally provided by the elastic nature of the tines vibrating transversely to the longitudinal axis of such forks. Thus with the tines vertically downward, the restoring force is enhanced by a factor due to gravity making the fork rate fast, while with the tines vertically upward, the restoring force is decreased by such gravity factor. For example, one well constructed prior art tuning fork rated at 400 cycles per second has a difference of 34 parts per million between the two stated extremes of position, with intermediate errors for positions therebetween. As is known, the effect of acceleration in the speed of modern weapons is to multiply the error by the number of times the acceleration exceeds gravity.

One method of eliminating the attitude and acceleration errors of prior art tuning forks is to provide a gimbal mounting for such forks, as is disclosed in my copending application, Serial Number 564,497, filed February 9, 1956. In my instant invention I do not resort to any extraneous mounting to accomplish the desired result but provide a tuning fork which per se overcomes, and is immune to, the effects of gravity and acceleration. I accomplish this by causing the tines of the fork to vibrate torsionally, substantially about the longitudinal axes of the tines, and not laterally thereto as in the prior art forks. The tines of the fork of my instant invention are fitted with cross-pieces at their free ends, which cross-pieces are vibrated by the driving coil in a plane perpendicular to the tine axis, thus vibrating the tines in torsion. With the tines vibrating in torsion, it follows that the restoring force is independent of gravity and acceleration, and the fork frequency is free of errors due to such forces. By positioning the driving coil in the region between the cross pieces and laterally away from the tines, a compact design results. The direction of the torsional vibration at any given moment of the individual tines is in opposite directions. Hence at the base of the fork, and at the support for the fork at the base, these oppositely directed movements compensate each other and transmit no vibration to the base and support.

It should here be noted that the ageing characteristic of the torsional fork of my instant invention is greatly improved over that of prior art forks since the bending in my torsional fork is distributed over the full length of the tine, whereas in the prior art fork the bending stress is confined to a short region near the base of the fork. Hence with the passage of time there is less change in the rated frequency of my torsional fork. The frequency of my torsional fork is also less responsive to external changes in the electrical circuit, that is, it has a high Q. The higher Q factor results from the lower internal friction resulting from the smaller bending per unit of length and the elimination of all motion transmitted to, and lost in, the mounting since there is no vertical component of any arcuate tine motion as in the prior art forks.

The torsional tuning fork of my instant invention will more readily be understood from the following description of illustrative embodiments thereof in conjunction with the appended drawing, in which.

Figure 1:
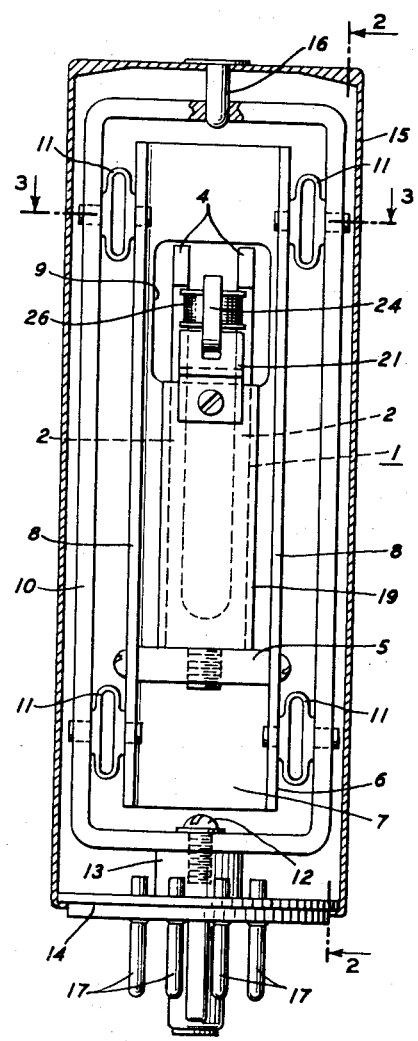
Figure 1 is a front elevational section of a first illustrative embodiment in simplified form, omitting such elements of the complete assembly as are not required for a full understanding of my invention.

The fork 1 is of an alloy having a slight positive temperature coefficient of elasticity, for example of elinvar, having a +20 p. p. m./° C. coefficient, while bonded to one face of the tines 2 is a thin layer 3 of an alloy having a negative temperature coefficient, for example of carbon steel, having a −170 p. p. m./° C. coefficient. Integrally affixed to the free end of each tine, a cross-piece or member 4 is of such material, for example, of which the thermal expansion is such as to produce a slight negative coefficient due to its increased moment of inertia relative to that of the tuning fork 1 per se. The latter coefficient may nevertheless be zero or even positive, in which event, however, the need for the thin layer 3 is eliminated.

The base of the fork 1 is supported, for example, by being screwed into a threaded bore, on the support 5 which in turn is affixed within a cradle 6. The cradle 6 has a bottom 7 and the spaced lateral flanges 8, the bottom 7 having an elongated opening 9 through which one end region of the cross members 4 extend, together with at least a portion of the magnet and coil associated therewith as below described. The cradle 6 is resiliently supported within a rectangular frame 10 by a plurality of silicone rubber shock absorbers 11, which are essentially sections of tubing having integral, diametrically opposite, extensions fitting snugly into bores in the flanges 8 of the cradle and into bores in the frame 10, respectively. Frame 10 is rigidly supported at its bottom (Figures 1 and 2) by the screw 12 through a spacer block 13 supported on the bottom 14 for the housing 15, the upper arm of frame having a bore into which the pin 16, extending inwardly from the integral cover of the housing 15, fits snugly on properly assembling the housing 15 to the bottom or base 14. Through the base 14 there extends a plurality of terminal pins 17 by which the leads from the coils, and other electrical elements not here shown, which may be mounted on the cradle, pass from the interior to the exterior of the housing.

The dimensions of the housing, frame and cradle are such that every portion of the frame has a relatively substantial clearance relative to the inner surface of the housing on the one hand and relative to the outer surfaces of the cradle on the other. Reference is made to my U. S. Patent 2,707,234, issued April 26, 1955, showing a complete and compact tuning fork oscillator of the type for which the torsional fork of my instant invention is adapted, and of which particularly the electrical elements of the circuit and their positioning, other than the driving and pick-up coils, are herein incorporated by reference.

Support 5 simultaneously functions as a spacer member for two upright struts, 18 and 19, carrying the plate supports, 20 and 21, at their upper end regions. Each of the plate supports has a notch 22 (Figure 2) for tightly receiving a U-shaped magnet, 23 or 24, about the arm of each of which the closer to the tines 2, the driving coil 25 and the pick-up coil 26 are wound, respectively. To retain the required compactness and miniaturization of the complete assembly, the coils 25 and 26 preferably do not extend into the space between the cross-pieces 4 but are so supported that while axially aligned with the central region of such space between the cross-pieces, their upper faces are closely below the cross-pieces. In this way the physical size of the coils will in no way interfere with the throw of the cross-pieces on vibration thereof. The cross-pieces 4 extend laterally of the tines so that their ends are aligned substantially with the arm of each magnet, 23 and 24, the more remote from the tines, while the magnets are substantially centrally aligned between the cross-pieces with preferably at least a tip portion of the core arms protruding into the region between the cross-pieces.

On energization of the driving coil 25, the regions of the cross-pieces adjacent thereto will be alternately drawn to and repelled from each other and execute vibrations in the plane of the cross-pieces about their central portions 27 integral with the free ends of the tines, vibrating the latter in torsion. The regions of the cross-pieces to the other side of the central portions 27 executing such alternate movement away from and toward the magnet 24 and the pick-up coil 26, when the coils are connected in a circuit such as that shown in the above mentioned Patent 2,707,234, the fork will maintain its oscillations, and will therefore induce current of the rated frequency in coil 26. Since the direction of the torsional movement of each tine 2, as also the direction of movement of each cross-piece, is opposite to that of the other tine, respectively cross-piece, at all times, and hence at the base of the fork body compensate each other, no vibration is transmitted to the support 5 or to the cradle 6.

Figure 2:
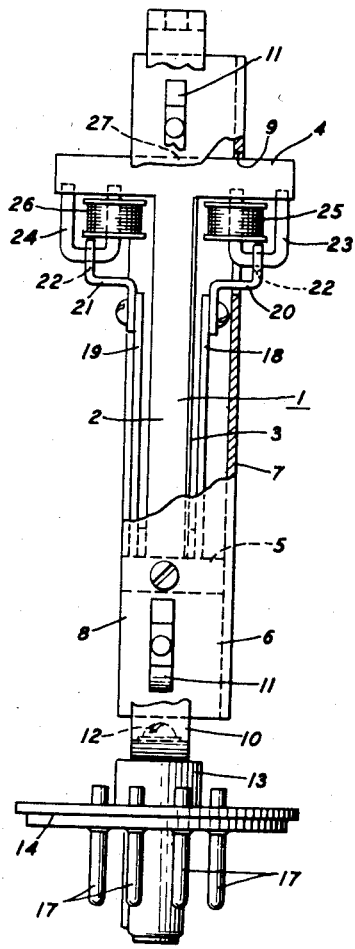
Figure 2 is a section along line 2—2 of Figure 1 with the housing removed.
Figure 3:
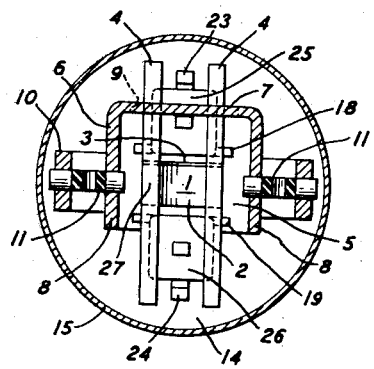
Figure 3 is a section along line 3—3 of Figure 1.
Figure 4B:
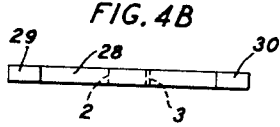
Figures 4A and 4B are an elevational and a top view of an alternative form of the cross-piece.
Figure 4A:
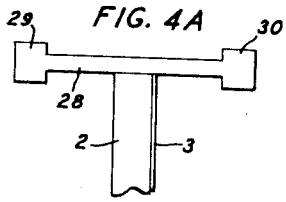

In the embodiment of Figures 1 through 3, I have shown the cross-piece 4 as of uniform rectangular cross-section throughout. In Figures 4A and 4B I show an alternative form thereof in which the cross-piece 28 has its end regions, 29 and 30, of concentrated mass in the form of rectangular cross-sections of greater height than, but of the same width as, the cross-piece regions intermediate its ends. In this alternative form, while the mass of the cross-piece may be decreased relative to that shown in Figures 1 through 3, the moment of inertia may be maintained the same in that the mass is located substantially at the ends where it contributes most to the moment of inertia, rather than being distributed uniformly over the whole length of the cross-piece with the center regions thereof contributing little to the moment of inertia. Furthermore, by reducing the net mass at the end of the tine and concentrating the weight thereof at the end of the cross-piece, the fork is rendered more immune to mechanical shock which might cause extraneous and unwanted signal waves.

Figure 5A:
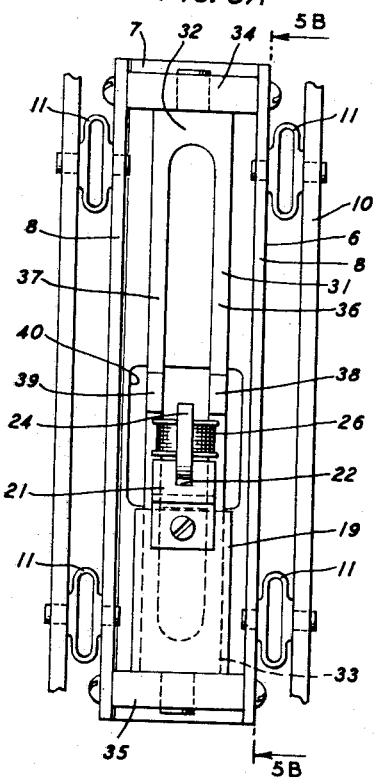
Figures 5A and 5B are front elevational and side elevational sections, respectively, of an alternative illustrative embodiment of the torsional tuning fork of my instant invention.
Figure 5B:
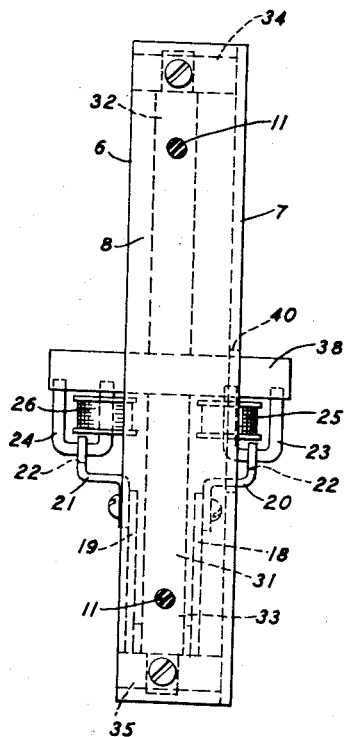
Figure 5B:

In the second illustrative embodiment of the torsional fork of my instant invention shown diagrammatically in Figures 5A and 5B, a double ended tuning fork 31, which in effect is two tuning forks with the free ends of their tines positioned on, and aligned with, each other, is supported at its two bases 32 and 33 in blocks 34 and 35 in the cradle 6. Integral with substantially the midregion of each tine, 36 and 37, a cross-piece, 38 and 39, is driven, as in the embodiment of Figures 1 to 3, by the driving coil 25 to vibrate the cross-pieces 38 and 39 and thus the tines 36 and 37 in torsion and to generate the oscillatory potential in the pick-up coil 26. In this embodiment, the cradle bottom 7 is provided with a centrally disposed aperture 40 to permit an end region of the cross-pieces 38 and 39 to extend beyond the cradle bottom. The positioning of the other elements, which are identical with those of the embodiment of Figures 1 through 3, relative to the cross-pieces 38 and 39 is the same as in that embodiment. It will be noted that in both embodiments shown, the apertures 9 and 40 through the cradle bottom are of such dimensions as not to interfere with the vibrations of the cross-pieces, and that the cross-piece ends extending therethrough have adequate clearance from the interior surface of the housing. The embodiment of Figures 5A and 5B has the advantage over that of the first illustrative embodiment in that supporting it at both ends renders the effect of mechanical shock on the fork substantially less.

What I claim is:

1. A tuning fork comprising a pair of tines, a base common to and integral with the tines of the pair, and a single means adapted to vibrate the pair of tines simultaneously in torsion with each tine vibrating in opposite directions to the other.

2. A tuning fork comprising a base, a pair of tines extending from the base, a mass member extending laterally from each tine, and electromagnetic means energizable to attract and repel the mass member of each tine simultaneously to vibrate the tines torsionally in opposite directions.

3. A tuning fork oscillator comprising at least one base, a pair of tines extending from the base in parallel spaced alignment, a magnetizable cross-member extending from each tine of the pair, the extending cross-members being parallel to each other, a driving coil positioned between the extending cross-members at a region thereof laterally spaced from the tines which coil on energization drives the cross-members to vibrate the tines torsionally in opposite directions, and a pick-up coil of an electrical output circuit positioned between the tines laterally spaced therefrom to the opposite side thereof.

4. A tuning fork oscillator according to claim 3 in which the cross-members are integral with the free ends of the tines.

5. A tuning fork oscillator according to claim 3 in which the cross-members are positioned at the free ends of the tines, extend to both sides of the tines, and are of substantially uniform cross-section.

6. A tuning fork oscillator according to claim 3 in which the cross members are positioned at the free ends of the tines, extend to both sides of the tines, and have a uniform cross section at their central and intermediate regions and a substantially increased cross-section at their end regions.

7. A tuning fork oscillator according to claim 3 in which the fork has an upper and a lower base, the tines extending from one base to the other, and the cross-members extend from substantially the midregion of the tines.

8. A tuning fork oscillator according to claim 3 in which the base is supported in a channel extending beyond the tines, and the channel is resiliently supported in a frame about the channel.

9. A tuning fork oscillator comprising a fork having a base, a pair of tines extending from the base in parallel and transversely spaced alignment, the base and the tines consisting of longitudinal laminations of different metals having opposite temperature coefficients of elasticity, and a cross-member of magnetizable material attached to the free end of each tine and extending substantially perpendicular to the longitudinal and transverse fork directions, a support for the fork base, a longitudinal strut to each transverse side of the support, a driving coil, a pick-up coil, means to support a coil on each strut at a height and relatively central to the space between the cross-members so that on energization of the driving coil each cross-member is driven to vibrate the tines torsionally in opposite directions simultaneously and current is induced in the pick-up coil, a source of potential connected to the driving coil, and an output circuit connected to the pick-up coil.

10. A tuning fork oscillator according to claim 9 in which each of the coils is wound on one arm of a U-shaped magnetic core with a tip region of each arm extending beyond the coil, and the coil supporting means so positions the coils that at least a portion of each tip region extends into the space between the cross-members.

No references cited.